United States Patent Office 2,817,648
Patented Dec. 24, 1957

2,817,648

PROCESS FOR INHIBITING POLYMERIZATION IN FREE-RADICAL REACTIONS

Charles W. Gould and Stearns T. Putnam, Wilmington, and John C. Wright, Newark, Del., assignors to Hercules Powder Company, Wilmington, Del., a corporation of Delaware No Drawing. Application December 24, 1954,
Serial No. 477,594

8 Claims. (Cl. 260—84.3)

This invention relates to a process for inhibiting polymerization in free-radical reactions such as low temperature emulsion polymerization reactions of the type involved in the manufacture of GR–S rubber.

In the manufacture of synthetic rubber utilizing the well-known technique of emulsion polymerization at low temperatures of the order of 5° C., the polymerization reaction is stopped by adding an inhibitor or so-called shortstop to the reaction mixture when the desired conversion has been attained. The inhibitors or shortstops currently used by the synthetic rubber industry are sodium or potassium dimethyldithiocarbamates, either alone or mixed with sodium polysulfide, or a polyamine such as "Polyamine H" (Carbide and Carbon Chemicals Co.). While these, for the most part, have proven quite satisfactory, the industry is constantly on the lookout for new materials which will result in improvements and/or greater economies in operation without, of course, sacrificing anything in the quality of the product produced.

A principal object of the present invention is the provision of an effective and economical process for inhibiting or shortstopping polymerization reactions, particularly low temperature emulsion polymerization reactions of the type involved in the manufacture of GR–S rubber.

In accordance with the present invention it has been found that polymerization in free-radical reactions and particularly emulsion polymerization reactions can be effectively stopped or inhibited by adding to the reaction mixture a small amount of a trithione. The trithiones constitute a class of heterocyclics of the formula:

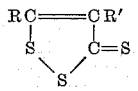

where R and R' are monovalent substituents which may be hydrogen or monovalent organic radicals whose free valences stem from carbon including aliphatic, aromatic, heterocyclic and alicyclic monovalent radicals. Trithiones in which R and R' are hydrogen or monovalent aliphatic or aromatic radicals are preferred. The substituents R and R' may be the same or different.

The trithiones may be prepared in any suitable manner such as by reacting sulfur or sulfur-containing compounds with an organic material containing the

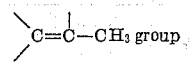

The organic material may be an organic compound which initially contains the

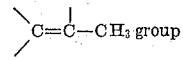

such as propylene, isobutylene, diisobutylene, α-methylstyrene, anethole, and so on, or alternatively may be an organic compound of a nature such that the

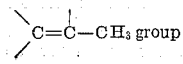

is formed during the reaction. For example, compounds of the following formula

where R is hydrogen or alkyl, i. e., the cumenes, may be reacted with sulfur at atmospheric pressure in the presence of bases to give good yields of 2-aryltrithiones. It appears that the cumenes are converted by an ionic mechanism to cumyl mercaptans and then to α-methylstyrenes. The α-methylstyrenes, in turn, rapidly react with sulfur to give trithiones.

The following equations will serve to illustrate the reactions involved in preparing representative compounds of the indicated type from the named starting materials.

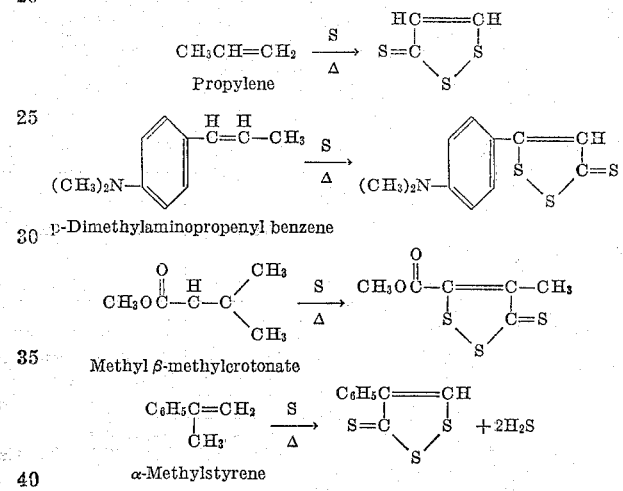

α-Methylstyrene

In carrying out the process in accordance with the invention, the polymerization of, for example, vinyl, vinylidene, and vinylene compounds is effected in the usual manner utilizing the well-known emulsion polymerization or other technique until the desired conversion is obtained whereupon an inhibitor of the type hereinabove indicated is added to the reaction mixture in a quantity sufficient to inhibit further polymerization. The resulting mixture is then treated in the usual or any desired manner to recover the polymeric product.

Having described the invention generally, the following examples are given to illustrate specific embodiments thereof. All parts given are parts by weight unless otherwise specified.

EXAMPLE 1

2-phenyltrithione was prepared from α-methylstyrene utilizing the method of Bottcher and Luttringhaus, Annalen der Chemie, 557, 105 (1945). The resulting crude reaction mixture contained about 41% of the trithione which was recovered as a substantially pure product by the formation and decomposition of the mercuric chloride addition complex. A styrene solution of the trithione containing 0.676 g. trithione per 100 ml. monomer was injected into a reaction vessel in which a GR–S emulsion polymerization was being carried out. The quantity of the styrene solution of the trithione so injected was such as to provide from about 0.1 to about 0.2 part of trithione per 100 parts of monomer, (i. e., styrene and butadiene) in the original reaction mixture. There was practically no further polymerization of the butadiene and styrene, even when the reaction temperature was raised from the usual 5° C. to 50° C. The results of several tests are summarized in Table I.

an amount equivalent to about 0.2 part trithione per 100 parts reaction monomer.

*Table I*

| Test No. | Percent Conversion at time short-stopped | Shortstop Added | | Percent Conversion at Given Time | | | | | |
|---|---|---|---|---|---|---|---|---|---|
| | | Type | Parts/100 monomer | Time, Hours | Temp., °C. | Percent Conv. | Time, Hours | Temp., °C. | Percent Conv. |
| 1 | 60 | None | | 3.1 | 5 | 80 | | | |
| 2 | 59 | Trithione a | 0.1 | 3.0 | 5 | 60 | | | |
| 3 | 59 | Trithione a | 0.2 | 3.0 | 5 | 60 | | | |
| 4 | 59.5 | None | | 2.5 | 5 | 79 | | | |
| 5 | 61.5 | Trithione a | 0.15 | 2.8 | 5 | 61 | 2.4 | 50 | b 62 |
| 6 | 56.5 | Goodrite 3955 d | 0.15 | 2.8 | 5 | 56.5 | 2.4 | 50 | c 58 | a Purified sample of 2-phenyltrithione prepared as indicated.
b Mooney viscosity, ML-4, 212° F. of coagulated sample was 67.
c Mooney viscosity, ML-4, 212° F. of coagulated sample was 59.
d Mixture of sodium dithiocarbamate and sodium sulfide.

EXAMPLE 2

Styrene solutions of the trithiones from mono- and diisobutylene and α-methylstyrene were made up each containing 0.676 g. of trithione per 100 ml. of styrene. The materials utilized in tests 1 and 2 (Table II) were relatively pure trithiones obtained from isobutylene and diisobutylene. In test No. 3, the trithione was a semicrude trithione obtained from diisobutylene and containing about 93% trithione. In test No. 4, the trithione was a crude reaction mixture obtained by reacting sulfur with α-methylstyrene utilizing the method of Bottcher and Luttringhaus. The crude reaction mixture contained 41% of the trithione.

A portion of the styrene solution in each case was injected into a reaction vessel in which a GR-S emulsion polymerization was being caried out. The material was added at the point of estimated 60% conversion and in Following addition of the material, the vessel was returned to the 5° C. bath and rotated for approximately 15 minutes, sampled, then rotated in the bath for 18 hours, and finally sampled again. The results are set forth in Table II.

*Table II*

| Test No. | Empirical Formula | Starting Material | Percent Conversion at Given Time | | | |
|---|---|---|---|---|---|---|
| | | | At time of short-stop | 12 hours later at 5° C. | Additional 4.5 hours at 5° C. | Additional 10 hours at 50° C. |
| 1 | $C_4H_4S_3$ | Isobutylene | 64.0 | 61.9 | 64.6 | 66.0 |
| 2 | $C_8H_{12}S_3$, M. P. 87° C | Diisobutylene | 65.7 | 64.2 | 66.9 | 67.0 |
| 3 | $C_8H_{12}S_3$, Semicrude | do | 64.0 | 63.6 | 66.2 | 66.1 |
| 4 | (¹) | α-methylstyrene | 62.4 | 62.8 | 64.2 | 63.1 |
| 5 | Goodrite 3955² Control | | 59.7 | 59.2 | 60.9 | 59.6 |

¹41% trithione, tested as is.
²Mixture of sodium dithiocarbamate and sodium sulfide.

Some of the materials set forth in Table II, i. e., those represented in tests 1, 2 and 4, were also evaluated for their ability to prevent rise in Mooney viscosity. Duplicate pairs of bottles were emptied, the contents stripped and coagulated at shortstop time and after further heating at 5° C. and 50° C. In each case a dispersion of PBNA antioxidant (1.25%) was added just before stripping. The Mooney viscosities of the two polymer samples were then compared, the results being set forth in Table III. Mooney viscosities within six units are considered equivalent.

*Table III*

| Test No. | Trithione of | Hydrocarbon Conversion | | | Mooney Viscosity, Ml., 100° C. | | | |
|---|---|---|---|---|---|---|---|---|
| | | At Shortstop Time | After ca. 12 hours at 5° C. | After 10 10 hours at 50° C. | At Shortstop | | After Additional Heating | |
| | | | | | 1.5 min. | 4.0 min. | 1.5 min. | 4.0 min. |
| 1 | Isobutylene | 61.6 / 61.5 | 61.5 | 62.6 | 71 | 58 | 64 | 54 |
| 2 | Diisobutylene a | 59.5 / 59.5 | 60.2 | 60.1 | 65 | 54 | 65 | 54 |
| 3 | Goodrite 3955 (Control) | 60.8 / 61.0 | 61.4 | 58.9 | 63 | 52 | 74 | 55 |
| 4 | α-Methylstyrene | 59.0 / 61.0 | 62.6 | 62.6 | 52.5 | 44.5 | 46.5 | 38.5 |
| 5 | Goodrite 3955 (Control) | 59.3 / 61.0 | 61.2 | 61.5 | 43.5 | 36.5 | 42.5 | 35.5 | a In this series, twice the normal amount of ferrous pyrophosphate activator was used.

As will be apparent from the examples, the trithiones are effective inhibitors whether used in substantially pure form or in the form of crude reaction mixtures obtained by reacting sulfur or sulfur-containing compounds with various types of organic starting materials. Thus, for example, Table I shows the effectiveness of purified 2-phenyltrithione. Table II shows the effectiveness of a crude trithione solution containing 41% trithione plus elemental sulfur, thiophenes, and other sulfur compounds. Table II also shows the effectiveness of relatively pure trithiones as well as a semicrude trithione. Further exemplary examples of suitable compounds which may be reacted with sulfur to form shortstops in accordance with the invention are isoprene, α-methylstilbene, anethole, estragole, eugenol, isoeugenol, safrol, isosafrol, ethyl α-furylacrylate, ethyl α-thenylacrylate, and so on.

In the preparation of the trithiones the preferred mole ratio of sulfur to the organic compound is from about 3 to about 8 moles of sulfur per mole of the organic compound. Optimum results are obtained when the mole ratio of sulfur to organic compound is about 5:1. Sulfur may be supplied in elemental form or in the form of compounds, such as the organic polysulfides, which liberate sulfur under the conditions of the reaction.

Temperatures employed will vary depending upon the particular materials and mole ratio of materials utilized. In general, however, temperatures between about 175° C. and 225° C. are satisfactory. The time of reaction will also vary but in most cases will be from about 1 to about 10 hours.

In the examples the material is added to the polymerization mixture in the form of a styrene solution. However, other means of addition, i. e., as an emulsion, suspension, water-soluble derivative, and so forth, may be utilized. The exact amount of trithione required to shortstop a reaction will vary with the particular trithione and the particular reaction mixture. In general, however, this will vary from about 0.01 part to about 1.0 part, and preferably from about 0.05 part to about 0.35 part per 100 parts of monomer utilized in forming the reaction mixture. Parts indicated are parts by weight.

It will thus be seen that the process of the present invention provides a means for effectively and economically short-stopping polymerization reactions and particularly emulsion polymerization reactions such as those involved in the manufacture of GR-S rubber. While a preferred embodiment of the invention has been disclosed the invention is not to be construed as limited thereby except as may be covered in the following claims.

What we claim and desired to protect by Letters Patent is:

1. In the preparation of a synthetic rubber latex by the aqueous emulsion polymerization of a mixture of butadiene-1,3 and styrene, the step of inhibiting further polymerization which comprises adding to the emulsion from about 0.01 to about 1 part, per 100 parts of polymerizable material initially present, of the reaction product of sulfur with an organic material containing the

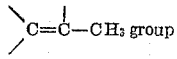

at a temperature between about 175° C. and about 225° C.

2. A process of inhibiting aqueous emulsion polymerization of butadiene-1,3-styrene mixtures which comprises adding to the emulsion a crude trithione obtained by reacting sulfur with an organic material containing the

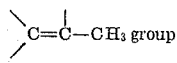

at temperatures between about 175° C. and about 225° C., said crude trithione being added in an amount such as to provide from about 0.01 to about 1 part of trithione per 100 parts of monomer.

3. A process as set forth in claim 2 wherein the crude trithione is added in a styrene solution.

4. A process of inhibiting aqueous emulsion polymerization of butadiene-1,3-styrene mixtures which comprises adding to the emulsion from about 0.01 to about 1.0 part, per 100 parts of monomer, of a trithione of the formula

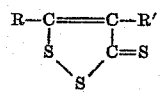

where R and R' are monovalent radicals selected from the class consisting of hydrogen, aliphatic, aromatic and alicyclic radicals.

5. A process as set forth in claim 1 wherein the organic material containing the

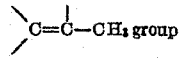

is α-methylstyrene.

6. A process as set forth in claim 1 wherein the organic material containing the

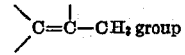

is isobutylene.

7. A process as set forth in claim 1 wherein the organic material containing the

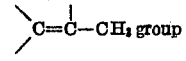

is diisobutylene.

8. A process as set forth in claim 4 wherein the trithione is 2-phenyltrithione.

References Cited in the file of this patent

UNITED STATES PATENTS 2,616,875    Adams et al. _____ Nov. 4, 1952